Figures 1, 2:
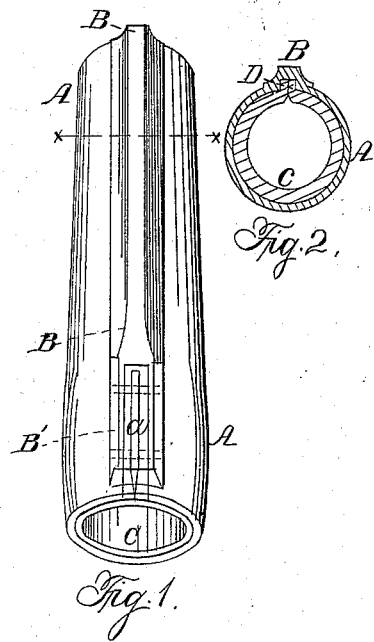

M. PALMER.
Axle-Box.

No. 3,463.

Patented Mar. 9, 1844.

UNITED STATES PATENT OFFICE.

MOSES PALMER, OF BALTIMORE, MARYLAND.

METHOD OF LINING METALLIC BOXES FOR HUBS OF CARRIAGE-WHEELS.

Specification of Letters Patent No. 3,463, dated March 9, 1844.

*To all whom it may concern:*

Be it known that I, MOSES PALMER, of the city of Baltimore, in the State of Maryland, have invented a new and useful improvement in the manner of constructing metal boxes for the hubs or naves of wheels, which improvement consists in the lining of said boxes with leather or hide or other substance of a like character; and I do hereby declare that the following is a full and exact description thereof.

My boxes are to be cast of iron or other metal and are to have a groove left along their interior, from end to end, to receive the edges of the leather or hide; and provision is to be made at one end of the box for securing the lining in place by means of rivets, wedges, or other analogous devices.

In the accompanying drawing, Figure 1 is a representation, in perspective, of one of my boxes, with its lining, and Fig. 2 a cross section in the line $x, x,$ of the box.

A, A, is the metallic box, which has a ridge B, B, along it, within which the groove is formed to receive the lining. C, C, is the lining, which may be of well tanned and close grained leather or of properly prepared dry hide. This lining has its edges passed into the groove, as shown at D; and at B¹ there is an opening left to secure the lining in place by means of a wedge, as shown at $a$, and by rivets passed through the ridge B, and through the leather and wedge, as shown by the dotted lines or by any suitable means.

The lining is to be condensed and duly formed by inserting a smooth bolt or piece having the shape of the intended axle. When thus finished and with an axle made smooth and true, a box of this kind will not only be noiseless, but will produce but little friction; it will also be very durable, and the lining, if necessary, may be easily renewed.

Having thus fully described the nature of my invention and shown the manner in which the same is to be carried into operation, what I claim as new therein and desire to secure by Letters Patent, is—

The combining of a lining of leather, or of hide, with a metallic box intended to be inserted in the hub or nave of a carriage wheel; such lining being secured in place and combined with the metal substantially in the manner therein set forth and made known.

MOSES PALMER.

Witnesses:
THOS. P. JONES,
EDWIN L. BRUNDAGE.